US008774010B2

(12) United States Patent  
Mishra et al.

(10) Patent No.: US 8,774,010 B2  
(45) Date of Patent: Jul. 8, 2014

(54) SYSTEM AND METHOD FOR PROVIDING PROACTIVE FAULT MONITORING IN A NETWORK ENVIRONMENT

(75) Inventors: Chandan Mishra, Sunnyvale, CA (US); Rohit S. Watve, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 12/938,237

(22) Filed: Nov. 2, 2010

(65) Prior Publication Data

US 2012/0106358 A1 May 3, 2012

(51) Int. Cl.
*H04L 1/00* (2006.01)
*H04L 12/26* (2006.01)
*G06F 15/173* (2006.01)

(52) U.S. Cl.
CPC .............. *H04L 12/26* (2013.01); *H04L 43/10* (2013.01); *H04L 43/0817* (2013.01); *G06F 15/173* (2013.01)
USPC ........ 370/242; 370/241.1; 370/243; 370/248; 370/251; 370/255; 709/239; 709/242

(58) Field of Classification Search
CPC ...... H04L 43/0817; H04L 43/10; H04L 12/26
USPC ............... 709/238–239, 242; 370/241.1–245, 370/248, 250–255
See application file for complete search history.

(56) References Cited

U.S. PATENT DOCUMENTS

| | | | |
|---|---|---|---|
| 4,006,320 A | 2/1977 | Markl | |
| 4,486,877 A | 12/1984 | Turner | |
| 4,569,042 A | 2/1986 | Larson | |
| 4,630,268 A | 12/1986 | Rodenbaugh | |
| 4,907,277 A | 3/1990 | Callens et al. | |
| 5,010,544 A | 4/1991 | Chang et al. | |
| 5,014,265 A | 5/1991 | Hahne et al. | |
| 5,121,382 A | 6/1992 | Yang et al. | |
| 5,159,592 A | 10/1992 | Perkins | |

(Continued)

FOREIGN PATENT DOCUMENTS

| | | |
|---|---|---|
| EP | 0361649 | 7/1989 |
| WO | WO 2008/010918 A2 | 1/2008 |
| WO | WO 2008/010918 A3 | 1/2008 |

OTHER PUBLICATIONS

Wikipedia, "IEEE 802.1ag," Connectivity Fault Management, retrieve and printed Nov. 2, 2010, 4 pages, http://en.wikipedia.org/wiki/IEEE_802.1ag.

(Continued)

*Primary Examiner* — Andrew Chriss
*Assistant Examiner* — Rasha Fayed
(74) *Attorney, Agent, or Firm* — Patent Capital Group

(57) ABSTRACT

An example method is provided and includes communicating a request packet to a first network element. The request packet is associated with a request for a list of flow parameters. The method also includes receiving a response to the request for the list of flow parameters, and communicating a test packet to initiate fault monitoring. The test packet is communicated to a second network element and the test packet includes at least one of the flow parameters provided by the first network element. The method also includes receiving a plurality of fault monitoring results. The results are limited to reflect multiple paths associated with the first network element.

20 Claims, 5 Drawing Sheets

(56) References Cited

U.S. PATENT DOCUMENTS

| | | |
|---|---|---|
| 5,243,342 A | 9/1993 | Kattemalalavadi et al. |
| 5,265,092 A | 11/1993 | Soloway et al. |
| 5,274,643 A | 12/1993 | Fisk |
| 5,321,694 A | 6/1994 | Chang et al. |
| 5,341,477 A | 8/1994 | Pitkin et al. |
| 5,343,461 A | 8/1994 | Barton et al. |
| 5,353,283 A | 10/1994 | Tsuchiya |
| 5,371,852 A | 12/1994 | Attanasio et al. |
| 5,394,402 A | 2/1995 | Ross |
| 5,416,842 A | 5/1995 | Aziz |
| 5,422,876 A | 6/1995 | Turudic |
| 5,426,637 A | 6/1995 | Derby et al. |
| 5,430,715 A | 7/1995 | Corbalis et al. |
| 5,430,727 A | 7/1995 | Callon |
| 5,450,394 A | 9/1995 | Gruber et al. |
| 5,450,449 A | 9/1995 | Kroon |
| 5,452,294 A | 9/1995 | Natarajan |
| 5,459,837 A | 10/1995 | Caccavale |
| 5,473,599 A | 12/1995 | Li et al. |
| 5,477,531 A | 12/1995 | McKee et al. |
| 5,491,692 A | 2/1996 | Gunner et al. |
| 5,500,851 A | 3/1996 | Kozaki et al. |
| 5,500,860 A | 3/1996 | Perlman et al. |
| 5,509,123 A | 4/1996 | Dobbins et al. |
| 5,519,704 A | 5/1996 | Farinacci et al. |
| 5,521,907 A | 5/1996 | Ennis et al. |
| 5,555,256 A | 9/1996 | Calamvokis |
| 5,561,669 A | 10/1996 | Lenny et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vatuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,708,502 A | 1/1998 | Denton et al. |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,812,528 A | 9/1998 | VanDervort |
| 5,819,089 A | 10/1998 | White |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,870,557 A | 2/1999 | Bellovin et al. |
| 5,884,010 A | 3/1999 | Chen et al. |
| 5,894,556 A | 4/1999 | Grimm et al. |
| 5,905,871 A | 5/1999 | Buskens et al. |
| 5,917,820 A | 6/1999 | Rekhter |
| 5,918,017 A | 6/1999 | Attanasio et al. |
| 5,918,019 A | 6/1999 | Valencia |
| 5,931,961 A | 8/1999 | Ranganathan et al. |
| 5,943,347 A | 8/1999 | Shepard |
| 5,983,265 A | 11/1999 | Martino, II |
| 5,987,011 A | 11/1999 | Toh |
| 5,991,809 A | 11/1999 | Kriegsman |
| 6,003,079 A | 12/1999 | Friedrich et al. |
| 6,006,264 A | 12/1999 | Colby et al. |
| 6,009,081 A | 12/1999 | Wheeler et al. |
| 6,018,516 A | 1/2000 | Packer |
| 6,023,455 A | 2/2000 | Takahashi |
| 6,023,733 A | 2/2000 | Periasamy et al. |
| 6,031,846 A | 2/2000 | Gurusami et al. |
| 6,032,194 A | 2/2000 | Gai et al. |
| 6,041,352 A | 3/2000 | Burdick et al. |
| 6,061,454 A | 5/2000 | Malik et al. |
| 6,070,190 A | 5/2000 | Reps et al. |
| 6,078,590 A | 6/2000 | Farinacci et al. |
| 6,078,956 A | 6/2000 | Bryant et al. |
| 6,088,717 A | 7/2000 | Reed et al. |
| 6,094,562 A | 7/2000 | Zhong |
| 6,101,180 A | 8/2000 | Donahue et al. |
| 6,104,695 A | 8/2000 | Wesley et al. |
| 6,115,711 A | 9/2000 | White |
| 6,115,752 A | 9/2000 | Chauhan |
| 6,118,765 A | 9/2000 | Phillips |
| 6,118,796 A | 9/2000 | Best et al. |
| 6,185,203 B1 | 2/2001 | Berman |
| 6,192,036 B1 | 2/2001 | Buhler et al. |
| 6,230,271 B1 | 5/2001 | Wadlow et al. |
| 6,252,851 B1 | 6/2001 | Siu et al. |
| 6,275,471 B1 | 8/2001 | Bushmitch et al. |
| 6,278,687 B1 | 8/2001 | Hunneyball |
| 6,286,045 B1 | 9/2001 | Griffiths et al. |
| 6,317,775 B1 | 11/2001 | Coile et al. |
| 6,337,861 B1 | 1/2002 | Rosen |
| 6,356,545 B1 | 3/2002 | Vargo et al. |
| 6,363,477 B1 | 3/2002 | Fletcher et al. |
| 6,389,006 B1 | 5/2002 | Bialik |
| 6,445,717 B1 | 9/2002 | Gibson et al. |
| 6,446,121 B1 | 9/2002 | Shah et al. |
| 6,510,150 B1 | 1/2003 | Ngo |
| 6,515,967 B1 | 2/2003 | Wei et al. |
| 6,526,044 B1 | 2/2003 | Cookmeyer et al. |
| 6,535,490 B1 | 3/2003 | Jain |
| 6,563,796 B1 | 5/2003 | Saito |
| 6,578,066 B1 | 6/2003 | Logan et al. |
| 6,584,438 B1 | 6/2003 | Manjunath et al. |
| 6,614,781 B1 | 9/2003 | Elliott et al. |
| 6,628,624 B1 | 9/2003 | Mahajan et al. |
| 6,665,637 B2 | 12/2003 | Bruhn |
| 6,680,921 B1 | 1/2004 | Svanbro et al. |
| 6,687,225 B1 | 2/2004 | Kawarai et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,765,881 B1 | 7/2004 | Rajakarunanayake |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,845,091 B2 | 1/2005 | Ogier et al. |
| 6,901,048 B1 | 5/2005 | Wang et al. |
| 6,917,983 B1 | 7/2005 | Li |
| 6,940,821 B1 * | 9/2005 | Wei et al. ............... 370/244 |
| 6,944,132 B1 | 9/2005 | Aono et al. |
| 6,947,381 B2 | 9/2005 | Wen et al. |
| 7,013,267 B1 | 3/2006 | Huart et al. |
| 7,024,257 B2 | 4/2006 | Pearce et al. |
| 7,039,716 B1 | 5/2006 | Jagadeesan |
| 7,047,190 B1 | 5/2006 | Kapilow |
| 7,068,607 B2 | 6/2006 | Partain et al. |
| 7,069,034 B1 | 6/2006 | Sourour |
| 7,072,968 B2 | 7/2006 | Mikami et al. |
| 7,099,820 B1 | 8/2006 | Huart et al. |
| 7,133,368 B2 | 11/2006 | Zhang et al. |
| 7,143,184 B1 | 11/2006 | Shah et al. |
| 7,212,517 B2 | 5/2007 | Dzik |
| 7,283,474 B1 | 10/2007 | Bergenwall |
| 7,286,467 B1 | 10/2007 | Sylvain |
| 7,289,454 B2 | 10/2007 | Bovo et al. |
| 7,310,334 B1 | 12/2007 | FitzGerald et al. |
| 7,336,620 B2 | 2/2008 | Bennett |

(56) References Cited

U.S. PATENT DOCUMENTS

| | | | |
|---|---|---|---|
| 7,352,700 B2 | 4/2008 | Chan et al. | |
| 7,352,705 B1 | 4/2008 | Adhikari et al. | |
| 7,406,034 B1 | 7/2008 | Cometto et al. | |
| 7,417,993 B1 | 8/2008 | Ebergen et al. | |
| 7,426,577 B2* | 9/2008 | Bardzil et al. | 709/248 |
| 7,457,877 B1 | 11/2008 | Shah et al. | |
| 7,483,370 B1 | 1/2009 | Dayal et al. | |
| 7,496,044 B1 | 2/2009 | Wing | |
| 7,519,006 B1 | 4/2009 | Wing | |
| 7,525,949 B1* | 4/2009 | Rampal et al. | 370/352 |
| 7,564,858 B1 | 7/2009 | Moncada-Elias et al. | |
| 7,643,430 B2 | 1/2010 | Morandin | |
| 7,660,314 B2 | 2/2010 | Wybenga et al. | |
| 7,672,227 B2 | 3/2010 | Santoso et al. | |
| 7,729,267 B2 | 6/2010 | Oran et al. | |
| 7,760,735 B1 | 7/2010 | Chen et al. | |
| 7,817,580 B2 | 10/2010 | Jain et al. | |
| 7,864,712 B2 | 1/2011 | Khan et al. | |
| 7,870,611 B2* | 1/2011 | Ishikawa | 726/23 |
| 7,876,706 B2 | 1/2011 | Ekl et al. | |
| 7,886,080 B2 | 2/2011 | Sajassi et al. | |
| 7,944,470 B2* | 5/2011 | Foster et al. | 348/143 |
| 7,969,894 B2* | 6/2011 | Mangal | 370/242 |
| 7,983,174 B1* | 7/2011 | Monaghan et al. | 370/242 |
| 8,065,317 B2* | 11/2011 | Wang et al. | 707/769 |
| 8,077,633 B2 | 12/2011 | Jain et al. | |
| 8,116,213 B2* | 2/2012 | Krygowski | 370/248 |
| 8,116,229 B2* | 2/2012 | Pappu et al. | 370/254 |
| 8,174,996 B2* | 5/2012 | Omar | 370/252 |
| 8,244,909 B1* | 8/2012 | Hanson et al. | 709/238 |
| 8,291,077 B2* | 10/2012 | I'Anson | 709/225 |
| 8,514,746 B1 | 8/2013 | Goli et al. | |
| 8,582,467 B2 | 11/2013 | Hirota et al. | |
| 2002/0003775 A1 | 1/2002 | Nakano et al. | |
| 2002/0067693 A1 | 6/2002 | Kodialam et al. | |
| 2002/0073375 A1* | 6/2002 | Hollander | 714/739 |
| 2002/0083186 A1 | 6/2002 | Stringer | |
| 2002/0196802 A1* | 12/2002 | Sakov et al. | 370/432 |
| 2003/0041150 A1 | 2/2003 | Passman et al. | |
| 2003/0053419 A1 | 3/2003 | Kanazawa et al. | |
| 2003/0072269 A1 | 4/2003 | Teruhi et al. | |
| 2003/0097438 A1 | 5/2003 | Bearden et al. | |
| 2003/0110276 A1 | 6/2003 | Riddle | |
| 2003/0137972 A1 | 7/2003 | Kowalewski et al. | |
| 2003/0142680 A1 | 7/2003 | Oguchi | |
| 2003/0163772 A1 | 8/2003 | Jaworski | |
| 2003/0165114 A1 | 9/2003 | Kusama et al. | |
| 2003/0208616 A1 | 11/2003 | Laing et al. | |
| 2003/0219022 A1 | 11/2003 | Dillon et al. | |
| 2003/0220971 A1 | 11/2003 | Kressin | |
| 2003/0225549 A1 | 12/2003 | Shay et al. | |
| 2004/0008715 A1 | 1/2004 | Barrack et al. | |
| 2004/0052257 A1 | 3/2004 | Abdo et al. | |
| 2004/0073690 A1 | 4/2004 | Hepworth et al. | |
| 2004/0095893 A1* | 5/2004 | Goringe et al. | 370/252 |
| 2004/0114539 A1 | 6/2004 | Beshai et al. | |
| 2004/0125965 A1 | 7/2004 | Alberth et al. | |
| 2004/0170163 A1 | 9/2004 | Yik et al. | |
| 2004/0184323 A1 | 9/2004 | Mori et al. | |
| 2004/0193709 A1 | 9/2004 | Selvaggi et al. | |
| 2004/0218617 A1 | 11/2004 | Sagfors | |
| 2004/0223458 A1 | 11/2004 | Gentle | |
| 2004/0240431 A1 | 12/2004 | Makowski et al. | |
| 2004/0252646 A1 | 12/2004 | Adhikari et al. | |
| 2005/0036519 A1 | 2/2005 | Balakrishnan et al. | |
| 2005/0105474 A1 | 5/2005 | Metzler | |
| 2005/0111487 A1 | 5/2005 | Matta et al. | |
| 2005/0117576 A1 | 6/2005 | McDysan et al. | |
| 2005/0152406 A2 | 7/2005 | Chauveau | |
| 2005/0216599 A1 | 9/2005 | Anderson et al. | |
| 2005/0220123 A1 | 10/2005 | Wybenga et al. | |
| 2005/0226172 A1 | 10/2005 | Richardson | |
| 2005/0243733 A1 | 11/2005 | Crawford et al. | |
| 2005/0246041 A1 | 11/2005 | Kreifeldt et al. | |
| 2005/0259597 A1 | 11/2005 | Benedetto et al. | |
| 2005/0265356 A1* | 12/2005 | Kawarai et al. | 370/395.53 |
| 2005/0283639 A1 | 12/2005 | Le Pennec et al. | |
| 2005/0286419 A1 | 12/2005 | Joshi et al. | |
| 2005/0286436 A1 | 12/2005 | Flask | |
| 2006/0007869 A1 | 1/2006 | Hirota et al. | |
| 2006/0018333 A1 | 1/2006 | Windisch et al. | |
| 2006/0041431 A1 | 2/2006 | Maes | |
| 2006/0098586 A1 | 5/2006 | Farrell et al. | |
| 2006/0104217 A1 | 5/2006 | Lehane | |
| 2006/0104306 A1* | 5/2006 | Adamczyk et al. | 370/466 |
| 2006/0112400 A1 | 5/2006 | Zhang et al. | |
| 2006/0122835 A1 | 6/2006 | Huart et al. | |
| 2006/0133286 A1 | 6/2006 | Elie-Dit-Cosaque et al. | |
| 2006/0140136 A1 | 6/2006 | Filsfils et al. | |
| 2006/0159029 A1 | 7/2006 | Samuels et al. | |
| 2006/0179338 A1 | 8/2006 | Sumner | |
| 2006/0215684 A1 | 9/2006 | Capone | |
| 2006/0250967 A1* | 11/2006 | Miller et al. | 370/241 |
| 2006/0268742 A1 | 11/2006 | Chu et al. | |
| 2006/0274760 A1 | 12/2006 | Loher | |
| 2006/0280130 A1 | 12/2006 | Nomura et al. | |
| 2006/0291385 A1* | 12/2006 | Yang | 370/229 |
| 2007/0041335 A1 | 2/2007 | Znamova et al. | |
| 2007/0058571 A1 | 3/2007 | Rose | |
| 2007/0064616 A1 | 3/2007 | Miranda | |
| 2007/0107034 A1 | 5/2007 | Gotwals | |
| 2007/0127395 A1 | 6/2007 | Jain et al. | |
| 2007/0150480 A1* | 6/2007 | Hwang et al. | 707/10 |
| 2007/0153774 A1 | 7/2007 | Shay et al. | |
| 2007/0171835 A1 | 7/2007 | Gobara et al. | |
| 2007/0204017 A1* | 8/2007 | Maes | 709/223 |
| 2007/0212065 A1 | 9/2007 | Shin et al. | |
| 2007/0223462 A1* | 9/2007 | Hite et al. | 370/356 |
| 2007/0245034 A1 | 10/2007 | Retana et al. | |
| 2007/0258359 A1 | 11/2007 | Ogasawara et al. | |
| 2007/0263554 A1 | 11/2007 | Finn | |
| 2007/0286165 A1 | 12/2007 | Chu et al. | |
| 2008/0019282 A1 | 1/2008 | Alaria et al. | |
| 2008/0031149 A1 | 2/2008 | Hughes et al. | |
| 2008/0031154 A1 | 2/2008 | Niazi et al. | |
| 2008/0225733 A1* | 9/2008 | Hua et al. | 370/242 |
| 2009/0022069 A1 | 1/2009 | Khan et al. | |
| 2009/0028044 A1 | 1/2009 | Windisch et al. | |
| 2009/0059800 A1 | 3/2009 | Mohan | |
| 2009/0080334 A1 | 3/2009 | DeCusatis et al. | |
| 2009/0125595 A1* | 5/2009 | Maes | 709/206 |
| 2009/0144403 A1 | 6/2009 | Sajassi et al. | |
| 2009/0175274 A1 | 7/2009 | Aggarwal et al. | |
| 2009/0193057 A1* | 7/2009 | Maes | 707/200 |
| 2009/0201937 A1 | 8/2009 | Bragg et al. | |
| 2009/0219823 A1* | 9/2009 | Qian et al. | 370/250 |
| 2009/0219836 A1 | 9/2009 | Khan et al. | |
| 2009/0274153 A1 | 11/2009 | Kuo et al. | |
| 2009/0296588 A1* | 12/2009 | Nishi et al. | 370/242 |
| 2009/0328051 A1* | 12/2009 | Maes | 718/104 |
| 2010/0049826 A1* | 2/2010 | Maes | 709/217 |
| 2010/0061254 A1 | 3/2010 | Thottakkara et al. | |
| 2010/0061269 A1 | 3/2010 | Banerjee et al. | |
| 2010/0069052 A1* | 3/2010 | Ahomaki et al. | 455/414.3 |
| 2010/0182937 A1 | 7/2010 | Bellagamba | |
| 2010/0189118 A1 | 7/2010 | Nonaka | |
| 2010/0226244 A1* | 9/2010 | Mizutani et al. | 370/220 |
| 2010/0302936 A1 | 12/2010 | Jan et al. | |
| 2011/0019678 A1 | 1/2011 | Mehta et al. | |
| 2011/0134804 A1* | 6/2011 | Maes | 370/259 |
| 2011/0194403 A1 | 8/2011 | Sajassi et al. | |
| 2012/0106339 A1 | 5/2012 | Mishra et al. | |
| 2012/0113871 A1 | 5/2012 | Bulusu et al. | |
| 2012/0224510 A1 | 9/2012 | Bulusu et al. | |

OTHER PUBLICATIONS

PCT "International Preliminary Report on Patentability, Date of Issuance Jan. 20, 2009 (1 page), Written Opinion of the International Searching Authority, Date of Mailing Feb. 7, 2008 (6 pages) and International Search Report, Date of Mailing Feb. 7, 2008 (2 pages)," for PCT/US2007/015506.

G. Malkin, "Traceroute Using an IP Option," Network Working Group, RFC 1393, Jan. 1993; http://tools.ietf.org/pdf/rfc1393.pdf.

(56) References Cited

OTHER PUBLICATIONS

K. Kompella and G. Swallow, "Detecting Multi-Protocol Label Switched (MPLS) Data Plane Failures," Network Working Group, RFC 4379, Feb. 2006; http://tools.ietf.org/pdf/rfc4379.pdf.
U.S. Appl. No. 12/916,763, filed Nov. 1, 2010, entitled "Probing Specific Customer Flow in Layer-2 Multipath Networks," Inventor(s): Chandan Mishra et al.
U.S. Appl. No. 12/658,503, filed Feb. 5, 2010, entitled "Fault Isolation in Trill Networks," Inventor(s): Ali Sajassi et al.
U.S. Appl. No. 13/152,300, filed Jun. 2, 2011, entitled "System and Method for Managing Network Traffic Disruption," Inventor(s): Shekher Bulusu, et al.
U.S. Appl. No. 13/077,828, filed Mar. 31, 2011 entitled "System and Method for Probing Multiple Paths in a Network Environment," Inventor(s): Hariharan Balasubramanian, et al.
U.S. Appl. No. 13/160,957, filed Jun. 15, 2011, entitled "System and Method for Providing a Loop Free Topology in a Network Environment," Inventor(s): Shekher Bulusu, et al.
Andreasan et al., "RTP No-Op Payload Format," Internet Draft, Internet Engineering Task Force, Feb. 2004, pp. 1-8.
Callon et al., "A Framework for Multiprotocol Label Switching," IETF Network Working Group, Internet Draft draft-ietf-mpls-framework-02.txt, Nov. 21, 1997.
Cheng, Jin et al., "Fast TCP: Motivation, Architecture, Algorithms, Performance," Aug. 2, 2004, 44 pages.
Deering, S., et al., "Internet Protocol Version 6," RFC 1883, Dec. 1995.
Fedyk, D., et al., ISIS Extensions Supporting IEEE 802.1aq Shortest Path Bridging, Network Working Group Internet Draft, Mar. 8, 2011, 42 pages; http://tools.ietf.org/html/draft-ietf-isis-ieee-aq-05.
Feldman, N., "ARIS Specification," Internet Draft, Mar. 1997.
Gobrial, Margret N., "Evaluation of Border Gateway Protocol (BGP) Version 4(V4) in the Tactical Environment," Military Communications Conference, Oct. 21-24, 1996; Abstract Only http://ieeexplore.ieee.org/xpl/login.jsp?tp=&arnumber=569372&url=http%3A%2F%2Fieeexplore.ieee.org%2Fiel3%2F4198%2F12335%2F00569372.pdf%3Farnumber%3D569372.
Halabi, Bassam, *Internet Routing Architectures* (CISCO), Macmillan Technical Publishing, Apr. 23, 1997; Abstract and Table of Contents only. http://www.ciscopress.com/store/internet-routing-architectures-cisco-9781562056520.
Handley and V. Jacobson, "SDP: Session Description Protocol," RFC 2327; Apr. 1998, 43pgs.
Heinanen, J., "Multiprotocol Encapsulation over ATM Adaptation Layer 5," RFC 1483, Jul. 1993.
IEEE Standards Department, "Virtual Bridged Local Area Networks—Amendment 6: Provider Backbone Bridges—IEEE P802.1ah/D4.2," © 2008, Institute of Electrical and Electronics Engineers, Inc., Mar. 26, 2008; 116 pages.
IEEE Standards Department, "Virtual Bridged Local Area Networks—Amendment 9: Shortest Path Bridging—IEEE P802.1aq/D2.1," © 2009, Institute of Electrical and Electronics Engineers, Inc., Aug. 21, 2009; 208 pages.
Jennings, C., "NAT Classification Test Results," Internet Draft draft-jennings-behave-test-results-02draft-jennings-behave-test-results-02.txt, Jun. 25, 2006.
Katsube, Y. et al., "Toshiba's Router Architecture Extensions for ATM: Overview," RFC 2098, Feb. 1997.
Kessler, G., "Chapter 2.2 Ping of TCP: A Primer on Internet and TCP/IP Tools," RFC 1739; Dec. 1994; www.ietf.org.
Laubach, M., "Classical IP and ARP over ATM," RFC 1577, Jan. 1994.
Laubach, M., "IP over ATM Working Group's Recommendations for the ATM Forum's Multiprotocol BOF Version 1," RFC 1754, Jan. 1995.
Liao et al., "Adaptive Recovery Techniques for Real-time Audio Streams," IEEE INFOCOM2001; Twentieth Annual Joint Conference of the IEE Computer and Communications Societies Proceedings, Apr. 22-26, 2001, vol. 2, pp. 815-823.
McGovern, M., et al., "CATNIP: Common Architecture for the Internet," RFC 1707, Oct. 1994.
Nagami, K., et al., "Toshiba's Flow Attribute Notification Protocol (FANP) Specification," RFC 2129, Apr. 1997.
Newman, P. et al., "Ipsilon Flow Management Protocol Specification for IPv4 Version 1.0," RFC 1953, May 1996.
Newman, P. et al., "Ipsilon's General Switch Management Protocol Specification Version 1.1," RFC 1987, Aug. 1996.
Niccolini, S., et al. "How to store traceroute measurements and related metrics," Internet Draft draft-niccolini-ippm-storetraceroutes-02.txe., Oct. 24, 2005.
PCT "International Preliminary Report on Patentability (dated Jan. 26, 2010; 1 page) and Written Opinion of the International Searching Authority and International Search Report (dated Oct. 2, 2008; 7 pages)," for PCT International Application PCT/US2008/070243.
PCT Feb. 7, 2008 International Search Report for PCT/US2007/015506.
Perez, M., et al., "ATM Signaling Support for IP over ATM," RFC 1755, Feb. 1995.
Perlman, et al., "Rbridges: Base Protocol Specification," IETF Draft, Jan. 2009.
Perlman, Radia, "Rbridges: Transparent Routing," in Proc. IEEE INFOCOM, Mar. 2004.
Rosen et al., "A Proposed Architecture for MPLS," IETF Network Working Group, Internet Draft draft-ietf-mpls-arch-00.txt, Aug. 1997.
Rosen et al., "MPLS Label Stock Encoding," RFC 3032, Jan. 2001.
Rosenberg et al., "STUN—Simple Traversal of User Datagram Protocol (UDP) Through Network Address Translators (NATs)," Network Working Group, RFC 3489, Mar. 2003, 44 pgs.
Schulzrinne, H., et al., "RTP, A Transport Protocol for Real-Time Applications," Network Working Group RFC3550, Jul. 2003, 98 pages.
Smith, Bradley R., et al., "Securing the Border Gateway Routing Protocol," Global Telecommunications Conference, Nov. 18-22, 1996.
Touch, et al., Transparent Interconnection of Lots of Links (TRILL): Problem and Applicability Statement, RFC 5556, IETF, May 2009.
Townsley, et al., "Layer Two Tunneling Protocol, L2TP," Network Working Group, RFC 2661, Aug. 1999, 75 pages.
U.S. Appl. No. 13/152,200, filed Jun. 2, 2011, entitled "System and Method for Managing Network Traffic Disruption," Inventor(s): Shekher Bulusu, et al.
U.S. Appl. No. 13/209,839, filed Aug. 15, 2011, entitled "Proxy FHRP for Anycast Routing Service," Inventors: Rai Smita, et al.
U.S. Appl. No. 13/453,576, filed Apr. 23, 2012, entitled "System and Method for Selecting a Root Node in a Network Environment," Inventor(s): Ayan Banerjee, et al.
Ullman, R., "Rap: Internet Route Access Protocol," RFC 1476, Jun. 1993.
USPTO Nov. 16, 2012 Non-Final Office Action from U.S. Appl. No. 12/771,853.
USPTO Dec. 11, 2012 Response to Sep. 25, 2012 Non-Final Office Action from U.S. Appl. No. 12/941,881.
USPTO Jun. 8, 2012 Non-Final Office Action from U.S. Appl. No. 12/771,853.
USPTO Sep. 25, 2012 Non-Final Office Action from U.S. Appl. No. 12/941,881.
USPTO Sep. 7, 2012 Response to Non-Final Office Action dated Jun. 8, 2012 from U.S. Appl. No. 12/771,853.
USPTO Jan. 7, 2013 Non-Final Office Action from U.S. Appl. No. 13/160,957.
USPTO Feb. 27, 2013 Final Office Action from U.S. Appl. No. 12/941,881.
USPTO Feb. 9, 2013 Response to Non-Final Office Action dated Nov. 16, 2012 from U.S. Appl. No. 12/771,853.
USPTO Mar. 26, 2013 Non-Final Office Action from U.S. Appl. No. 13/077,828.
USPTO Apr. 2, 2013 Response to Non-Final Office Action dated Jan. 7, 2013 from U.S. Appl. No. 13/160,957.
USPTO May 24, 2013 RCE Response to Final Office Action dated Feb. 27, 2013 from U.S. Appl. No. 12/941,881.

(56) References Cited

OTHER PUBLICATIONS

USPTO May 24, 2013 Supplemental Response to Final Office Action dated Feb. 27, 2013 from U.S. Appl. No. 12/941,881.
USPTO May 8, 2013 Final Office Action from U.S. Appl. No. 13/160,957.
USPTO Jun. 11, 2013 Response to Mar. 26, 2013 Non-Final Office Action from U.S. Appl. No. 13/077,828.
USPTO Jun. 14, 2013 Notice of Allowance from U.S. Appl. No. 12/941,881.
USPTO Jun. 20, 2013 Non-Final Office Action from U.S. Appl. No. 13/041,148.
Viswanathan et al., "ARIS: Aggregate Route-Based IP Switching," Internet Draft, Mar. 1997.
Wang, Q. et al., "TCP-Friendly Congestion Control Schemes in the Internet," National Key Lab of Switching Technology and Telecommunication Networks, Beijing University of Posts & Telecommunications; 2001, pp. 211-216; http://www.sics.se/~runtong/11.pdf.
Woundy et al., "ARIS: Aggregate Route-Based IP Switching," Internet Draft draft-woundy-aris-ipswitching-00-txt, Nov. 1996.
USPTO Nov. 7, 2013 Final Office Action from U.S. Appl. No. 13/041,148.
USPTO Jan. 14, 2014 Notice of Allowance from U.S. Appl. No. 13/152,200.
USPTO Aug. 26, 2013 Response to Jun. 20, 2013 Non-Final Office Action from U.S. Appl. No. 13/041,148.
USPTO Jul. 5, 2013 Non-Final Office Action from U.S. Appl. No. 13/152,200.
USPTO Aug. 6, 2013 RCE Response to May 8, 2013 Final Office Action from U.S. Appl. No. 13/160,957.
USPTO Oct. 30, 2013 Notice of Allowance from U.S. Appl. No. 13/077,828.
USPTO Oct. 8, 2013 Non-Final Office Action from U.S. Appl. No. 13/453,576.

\* cited by examiner

SYSTEM AND METHOD FOR PROVIDING PROACTIVE FAULT MONITORING IN A NETWORK ENVIRONMENT

TECHNICAL FIELD

This disclosure relates in general to the field of communications and, more particularly, to providing proactive fault monitoring in a network environment.

BACKGROUND

Switching architectures have grown in complexity in recent years. Diverse switching technologies have emerged to accommodate a plethora of end users, as well as the preferences of service providers. For example, Data Center Ethernet (DCE) represents an extension to Classical Ethernet (CE), and it can offer a lower cost, lower latency, high-bandwidth configuration for network operators. Additionally, TRansparent Interconnection of Lots of Links (TRILL) networks offer multipathing architectures, which can be used to achieve effective packet communications. Proactive fault monitoring mechanisms represent an integral part of any Operations, Administration, and Maintenance (OAM) suite. A proactive fault monitoring mechanism can engender confidence for service providers concerned about the health of their network. In certain network scenarios, fault monitoring may become overly burdensome, or create a taxing processing load for individual components in the network. Implementing and managing suitable network fault monitoring activities presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes communicating a request packet to a first network element. The request packet can be associated with a request for a list of flow parameters. The method also includes receiving a response to the request for the list of flow parameters, and communicating a test packet to initiate fault monitoring. The test packet is communicated to a second network element and the test packet includes at least one of the flow parameters provided by the first network element. The method also includes receiving a plurality of fault monitoring results. The results are limited to reflect multiple paths associated with the first network element.

In more specific embodiments, the response to the request for the list of flow parameters includes a media access control (MAC) address associated with the second network element. The request packet includes a time to live (TTL) parameter set to one. In addition, a TTL expiry message can be received in response to the test packet. In particular implementations, the first network element and the second network element are separated by one hop in a network environment. The request packet can be communicated by an originating switch operating in a multipath network. The flow parameters can be associated with equal cost multiple paths (ECMPs) two hops from the originating switch. An additional request can be communicated to an additional network element, the additional request being associated with a request for an additional list of flow parameters. The additional request can trigger a subsequent fault monitoring process associated with the additional network element.

EXAMPLE EMBODIMENTS

Figure 1:
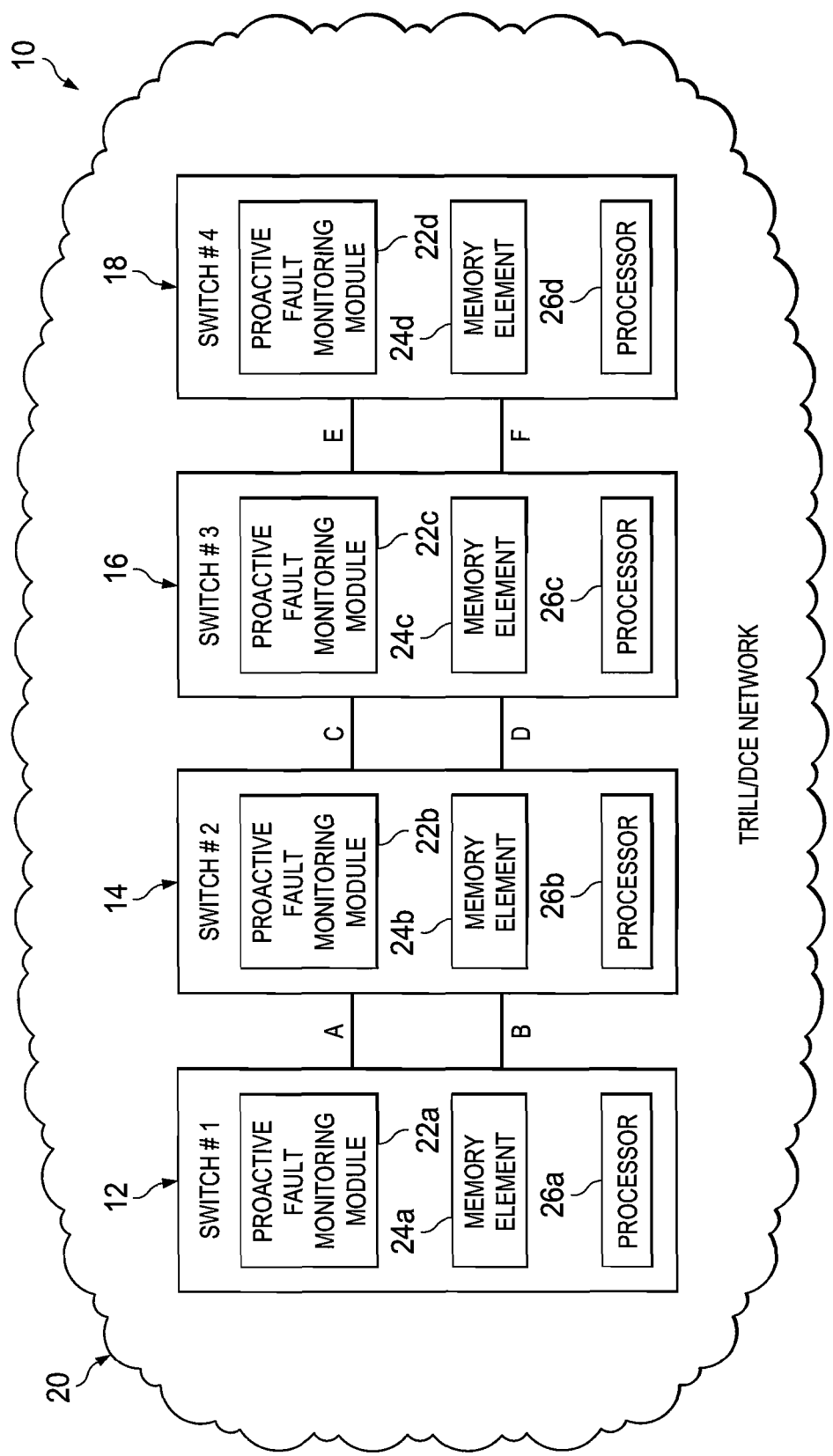
FIG. 1 is a simplified block diagram of a communication system for providing proactive fault monitoring in a network environment in accordance with one embodiment of the present disclosure.

Turning to FIG. 1, FIG. 1 is a simplified block diagram of a communication system 10 for providing proactive fault monitoring in a network environment in accordance with one embodiment. FIG. 1 may include a network 20 that further includes a plurality of switches 12, 14, 16, and 18. In a particular instance, network 20 may be representative of a multipath network, which may include architectures associated with a Data Center Ethernet (DCE) network, TRansparent Interconnection of Lots of Links (TRILL) network, or any other suitable switching architecture. Note that multipath networks commonly use a routing protocol (e.g., intermediate system to intermediate system (IS-IS)) for forwarding purposes, and a spanning tree protocol (STP) as their forwarding protocol. In a particular example, network 20 is simply representative of a layer 2 (L2) multipathing (L2MP) network, which may be executing the IS-IS forwarding protocol. The switches employing the IS-IS routing protocol may append information to frames sent through the network nodes. This appended information may be in the form of a media access control (MAC)-in-MAC header attached to the frame, for example. It should be understood that the IS-IS protocol being used herein is representative of one example protocol that can be implemented, where other link state routing protocols (e.g., Open Shortest Path First (OSPF), Enhanced Interior Gateway Routing Protocol (EIGRP)) may be used without departing from the scope of the embodiments.

Switches 12, 14, 16, and 18 can be coupled together via any suitable communication link (wired, optical, wireless, etc.), where the switches can use these links in order to exchange packets, frames, datagrams, etc. In the particular example of FIG. 1, the links are labeled a-f, while each of switches 12, 14, 16, and 18 are labeled switch #1, switch #2, switch #3, and switch #4 respectively. Additionally, each of switches 12, 14, 16, and 18 are provisioned with a respective memory element 24a-d, a respective processor 26a-d, and a respective proactive fault monitoring module 22a-d.

Note that in network management, fault monitoring represents the set of functions that detect, isolate, and/or correct malfunctions in a network. This can include compensating for environmental changes, maintaining and examining error logs, accepting and acting on error detection notifications, tracing and identifying faults, carrying out sequences of diagnostics tests, correcting faults, reporting error conditions, and localizing and tracing faults by examining and manipulating database information. When a fault (e.g., an event) occurs, a network component (e.g., a switch) can send a notification to a network operator, a service provider, an administrator, etc.

There are two primary ways to perform fault monitoring: proactively and passively. Passive fault monitoring is performed by collecting alarms, alerts, and/or notifications from devices when a fault is detected for the network, for a link, for a device, etc. In this mode, if the device being monitored fails, or if a link to that device becomes dysfunctional, the problem may not be detected. Proactive fault monitoring addresses this issue by actively monitoring devices (e.g., via tools such as PING) to determine if the device is active and responding. If the device stops responding, proactive fault monitoring can receive (or generate) an alarm showing the device as unavailable. This would allow for the proactive correction of the problem. Hence, the term 'proactive', as used herein in this Specification, means that the mechanism does not wait for problems to be reported in the network. Instead, the mechanism (using any suitable protocol) can systematically monitor the network, device, and/or links in order to discover problematic issues that could arise in the network.

Before turning to the example flows and infrastructure of example embodiments of the present disclosure, a brief overview of the switching environment is provided for purposes of context and explanation. Proactive monitoring in the network of FIG. 1 can allow for the flagging of problematic links between switches #1-#4 (e.g., before an end user would experience an application that malfunctions). Note that this larger monitoring issue can be viewed as a series of smaller fault monitoring problems, which (when aggregated) form the larger problem. In the example of FIG. 1, there are eight possible paths between switch #1 and switch #4 (links a-f). In the case of multipathing networks such as TRILL/DCE, proactive fault monitoring requires all Equal Cost Multiple Paths (ECMPs) to be monitored. This can create an exceptionally large number of links to be monitored. In the example of FIG. 1, the two-link device configuration yields eight (2×2×2) equal cost paths for monitoring.

Typically, in Classical Ethernet (CE) networks, and in STP, proactive fault monitoring is performed based on a virtual local area network (VLAN) configuration. Since STP guarantees a single path between any two endpoints for a given VLAN, it is a straightforward mechanism. However, STP does not guarantee an efficient utilization of all links available in the network. Variants of Internet protocol (IP) protocols (e.g., IS-IS) have been proposed to evaluate multiple ECMPs between any two nodes in a DCE network. Based on hardware configurations, data packets from a source (s) to a destination (d) can be hashed and sent on a specific path. Typically, a flow is defined based on some parameters in the data packet headers (source/destination address, port etc.), where packets in a flow can be hashed and sent onto a particular path. This poses a significant challenge for layer 2 protocols.

TRILL is an Internet Engineering Task Force (IETF) protocol implemented by switching devices. TRILL can introduce new data and control planes for Ethernet networks. Typical methods used for fault isolation for classical Ethernet architectures fail to perform in TRILL networks. For example, linktrace activities defined in IEEE standard 802.1ag-2007 (Connectivity Fault Management (CFM)) assumes a congruency of unicast and multicast paths in an Ethernet network, and a symmetry of forward and reverse paths. Ethernet CFM assumes the presence of a single path for a given VLAN between a source and a destination, as set up by the spanning tree protocol. Again, these conditions do not apply to TRILL networks. A TRILL network has multiple paths given a source and a destination address. In essence, no effective fault monitoring protocol exists for such networks.

Semantically, for multipathing networks such as TRILL/DCE, there can be number of ECMP between nodes. This number increases exponentially as the number of hops between the given nodes increases. Most significantly, this creates a scalability problem, where brute force mechanisms for testing all possible paths for proactive fault monitoring would not be effective.

A similar problem also exists with normal Internet Control Message Protocol (ICMP), when there are multiple paths present in the IP network. RFC 4379 provides a mechanism (e.g., implemented in MPLSTrace) for testing multiple label switched paths (LSPs) between a source and a destination by using a modification of the IP traceroute utility, where the router at each hop provides information on how its downstream paths toward a particular destination can be exercised. Subsequently, the ingress can send MPLS ping requests that exercise these paths. The idea is based on the concept that forwarding on a Forwarding Equivalence Class (FEC) is based on the MPLS label; however, exercising multiple paths in the FEC is based on a hash of a source and a destination IP address, along with the transport layer source and the destination port fields. Hence, maintaining the same outer labels would theoretically ensure that packets reach their destination from the source. In modifying inner IP fields, a particular ECMP (from source to destination) can be chosen.

These protocols have significant drawbacks: not the least of which is the increased processing load on the intermediate network elements. This is because each of the destination IP addresses in an arbitrary set of IP addresses need to be hashed, where the next hops are determined by the intermediate node. Additionally, in cases where the source node does not provide an adequate number of destination IP addresses to the intermediate nodes, then not all paths can be exercised. Furthermore, this process becomes even more complicated when attempting to test all possible ECMPs.

In accordance with certain embodiments of communication system 10, proactive fault monitoring can be accomplished in multipathing networks by employing a distributed approach. The distributed approach can simplify the fault monitoring problem, and effectively test the links involved in all ECMPs between two switches. Additionally, such a protocol can test switching at each intermediate node involved in the ECMPs between the two switches.

In general terms, each node can effectively test the switching capability of the next hop node. A given node can request the next hop switch to return a list of different MAC addresses. The MAC addresses can exercise all possible ECMPs through a given switch (to the destination). For specific packets, the Time to Live (TTL) can be set to one (TTL=1). This parameter can be used to reach the first hop switch, where TTL=2 can be used to reach second hop switch. The requesting switch can then test all paths up to the second hop switch by sending packets with the appropriate MAC addresses (where the TTL=2). Effectively, this would test the links from the originating switch to the second hop switch. Subsequently, the process can be repeated at each node on all ECMPs.

In a general sense, one switch in the network can be tasked with solving part of the fault monitoring issue. The remainder of the fault monitoring would be effectively offloaded to the next switch in the pathway. This next switch can be the next hop switch downstream: toward the destination. The results of this testing can then be aggregated and sent back to any appropriate node (e.g., the originating switch that initiated the fault monitoring protocol). In one particular example, switch #1 would receive the aggregated results from the fault monitoring that occurred downstream.

In operation of an example scenario involving FIG. 1, switch #1 can communicate a packet with a TTL=1. This packet may be used to retrieve a range of MAC addresses (or other parameters) to exercise the ECMPs extending to the second hop switch in the network. From this juncture, a flow can be selected to test each ECMP from the current switch (i.e., switch #1) to the second hop switch. The fault monitoring request can be forwarded to the next switch (e.g., the first hop switch is in the network). The procedure can be repeated: testing the ECMPs between the first and the third hops. Each of these switches can simply forward the request to switches provisioned next to it in the network.

Note that in terms of minimizing complexity in the fault monitoring process, consider a case in which there are n nodes in the network: having p1, p2 . . . pn−1 number of parallel paths between first and second nodes, second and third nodes, etc. The number of paths to be tested can be represented as: p1×p2×p3 . . . xp (n−1)=> order of exp(n). This is an exceptionally large number, which creates problematic scaling issues. In using the protocol of communication system 10, the first node would only be responsible for testing p1×p2 paths. In general, the $k^{th}$ node would test the pk×p (k+1) paths. When considering all the possible tests being performed in a network for fault monitoring, the total paths tested would be: p1×p2+p2×p3+ . . . p(n−2)×p(n−1)=> order of n. Hence, there is a significant reduction in the processing responsibilities that would otherwise be relegated to devices in the network. Details relating to the possible signaling and interactions between the components of communication system 10 are provided below with reference to FIGS. 2-4B. Before turning to some of the additional operations of this architecture, a brief discussion is provided about some of the infrastructure of the architecture.

Switches 12, 14, 16, and 18 are network elements that route or that switch (or that cooperate with each other in order to route or switch) traffic and/or packets in a network environment. As used herein in this Specification, the term 'network element' is meant to encompass switches, routers, gateways, bridges, loadbalancers, firewalls, inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information.

Note that switches 12, 14, 16, and 18 may share (or coordinate) certain processing operations. Using a similar rationale, their respective memory elements may store, maintain, and/or update data in any number of possible manners. In a general sense, the arrangement depicted in FIG. 1 may be more logical in its representations, whereas a physical architecture may include various permutations/combinations/hybrids of these elements. In one example implementation, switches 12, 14, 16, and 18 include software (e.g., as part of proactive fault monitoring modules 22a-d) to achieve the fault monitoring operations, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of FIGS. 1-4A may include any suitable algorithms, hardware, software, components, modules, interfaces, or objects that facilitate these switching operations.

Network 20 represents a series of points or nodes of interconnected communication paths for receiving and transmitting packets of information that propagate through communication system 10. Network 20 can be any type of switching network (e.g., TRILL, DCE, CE, etc.) in particular implementations of the present disclosure. The network offers a communicative interface between network elements (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The network can support a transmission control protocol (TCP)/IP, or a user datagram protocol (UDP)/IP in particular embodiments of the present disclosure; however, the network may alternatively implement any other suitable communication protocol for transmitting and receiving data packets within communication system 10.

Figure 2:
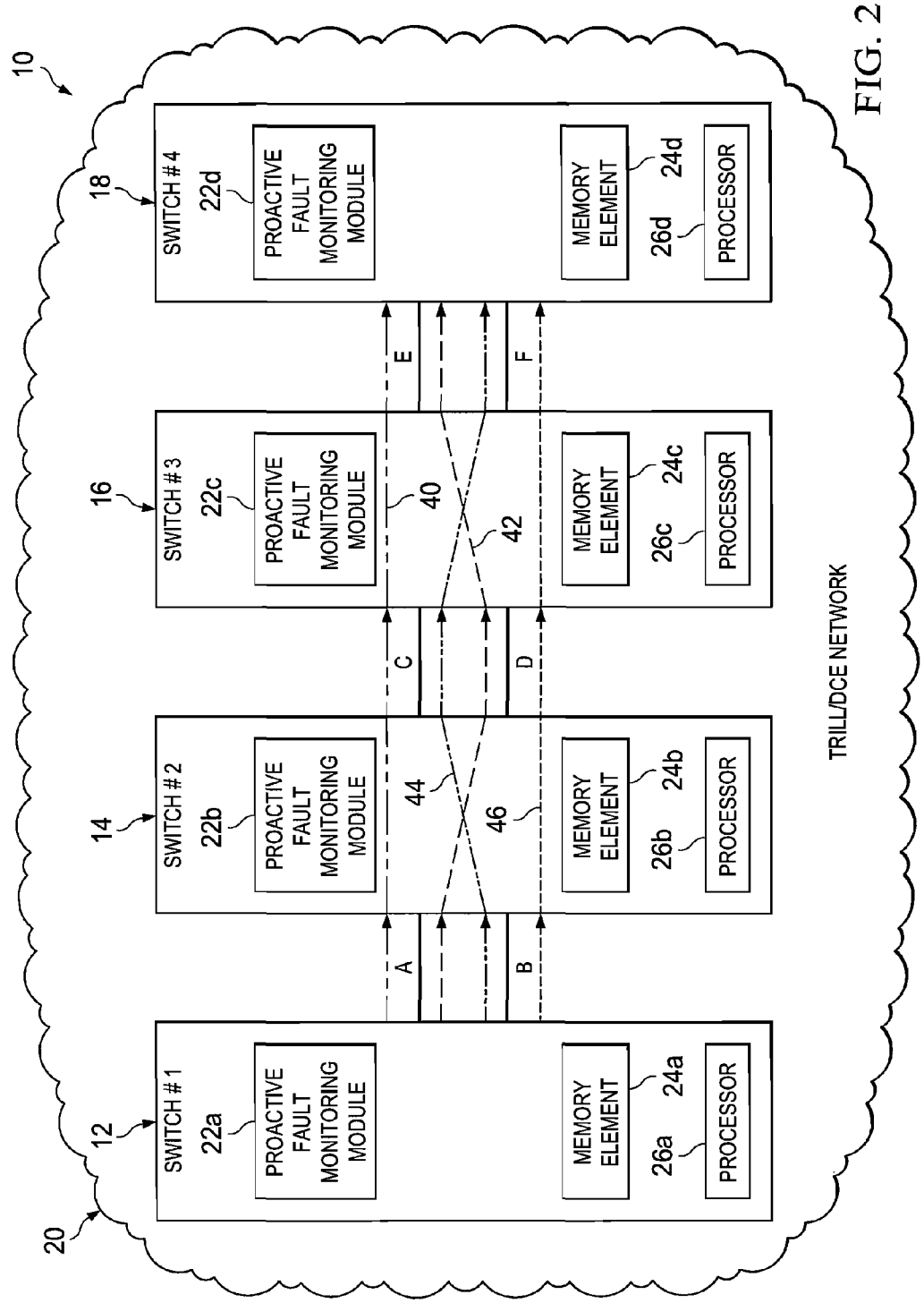
FIG. 2 is a simplified block diagram illustrating additional details related to the communication system in accordance with one embodiment.

FIG. 2 illustrates one possible operation associated with communication system 10. In this particular arrangement, links can be tested by utilizing two paths out of the eight potential paths. FIG. 2 illustrates a set of links 40, 42, 44, and 46, which reflect links being employed for fault monitoring in the network. More specifically, switching from one ingress port to other egress port can be checked by testing four paths (e.g., ace, ade, bcf, bdf).

Figure 3:
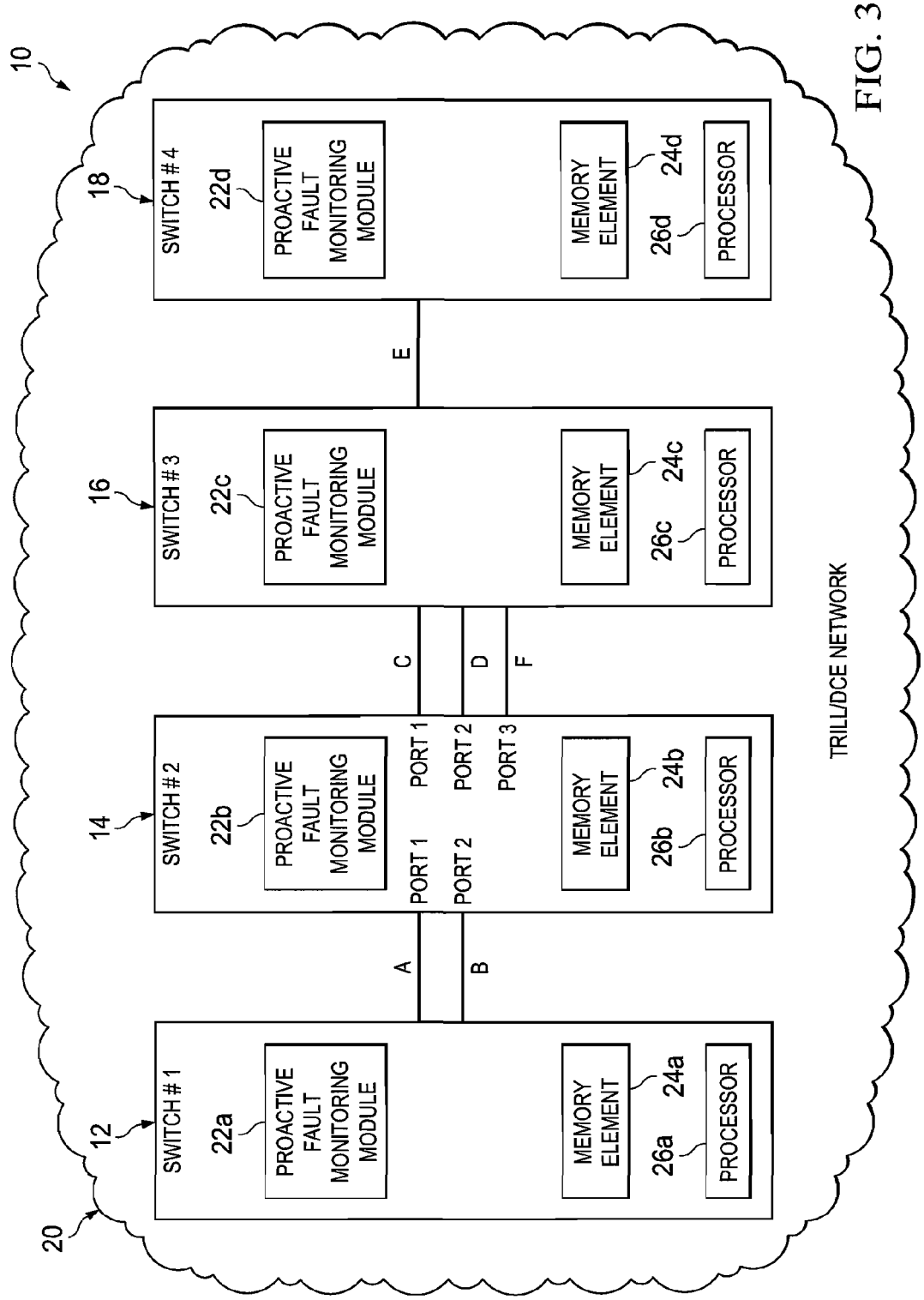
FIG. 3 is a simplified block diagram illustrating additional details related to the communication system in accordance with one embodiment.

Turning to FIG. 3, FIG. 3 is a simplified block diagram further detailing how link states and switching paths can be properly evaluated. As part of the proactive fault monitoring protocol, the problem can be reduced by solving two important sub-issues within the fault monitoring framework. For example, the protocol can monitor links involved in the ECMPs between two network endpoints. Additionally, the switching paths (on the intermediate nodes) involved in all of the ECMPs can be monitored. Note that at each intermediate switch, the number of switching paths can be limited by the number of input ports multiplied by the number of output ports. Hence, for switch #2 in this example, three output ports and two input ports would result in six switching paths to be monitored. The challenge is to effectively test these paths, while minimizing processing overhead.

For the example implementation depicted by FIG. 3, fault monitoring is effectively distributed to each of the switches. Each switch of FIG. 3 can effectively monitor the switching capability of the next switch in the network (toward the destination). More specifically, each switch tests the switching paths of the next hop switch involved in the ECMPs toward the end destination. This can be accomplished by sending packets (with varying flows) having a TTL=2. The second hop switch can respond with the TTL expiry message. If the originating switch does not receive the TTL expiry message for the test packets it has sent, then it can assume a failure condition is present, and report this failure back to the previous switch in the network.

The flow parameters to exercise different ECMP paths can be found by interfacing with the first hop switch (i.e., again by setting TTL=1). The first hop switch can then repeat the fault-monitoring process, and report the results back to the previous switch. If the intermediate switch is directly connected to the end destination, then it will not continue to propagate the fault-monitoring process and, instead, return a success indication (e.g., a no fault packet) back to the previous switch.

Figure 4A:
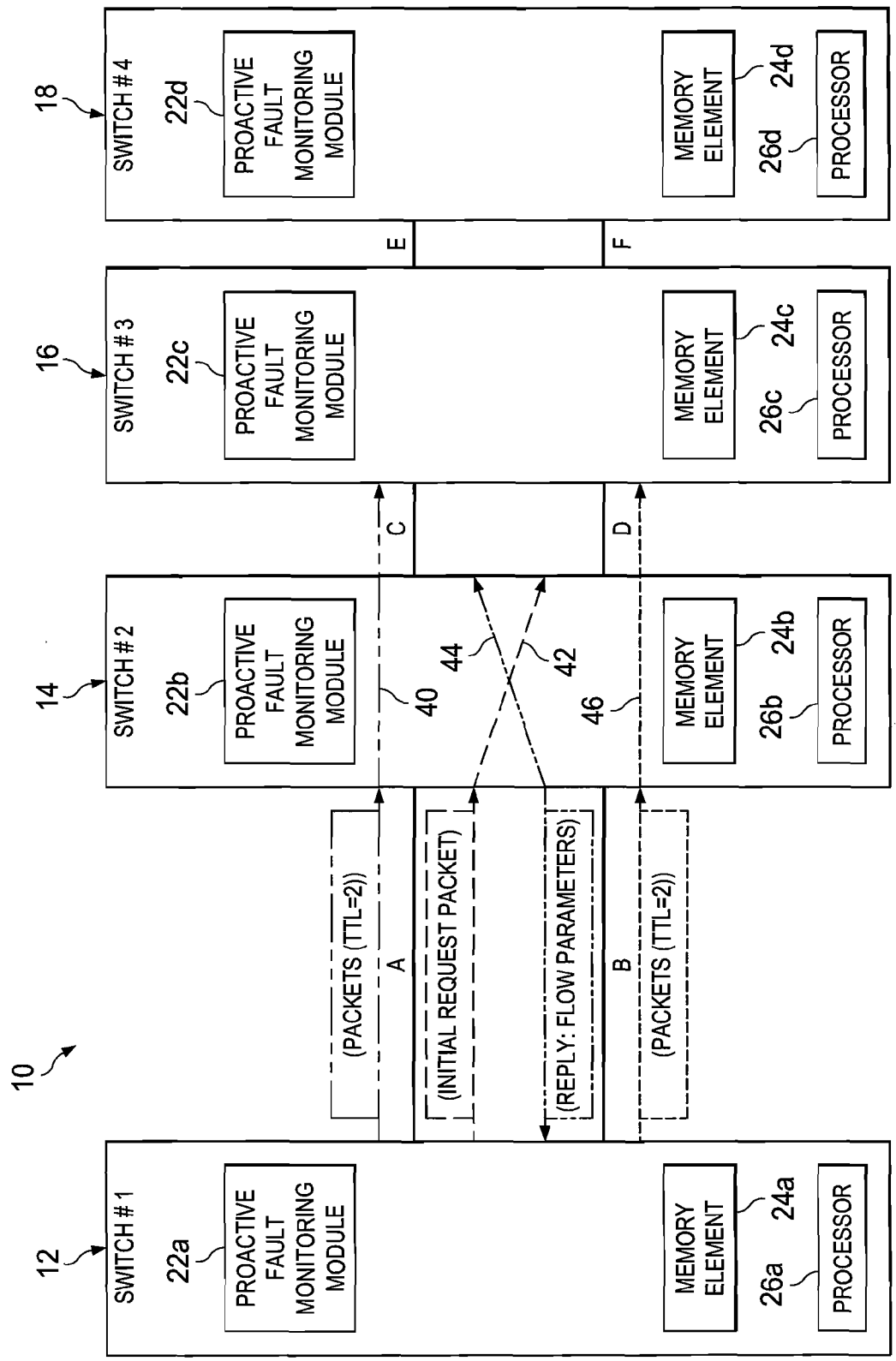
FIG. 4A is a simplified block diagram illustrating additional details related to an example activity of the communication system in accordance with one embodiment.
Figure 4B:
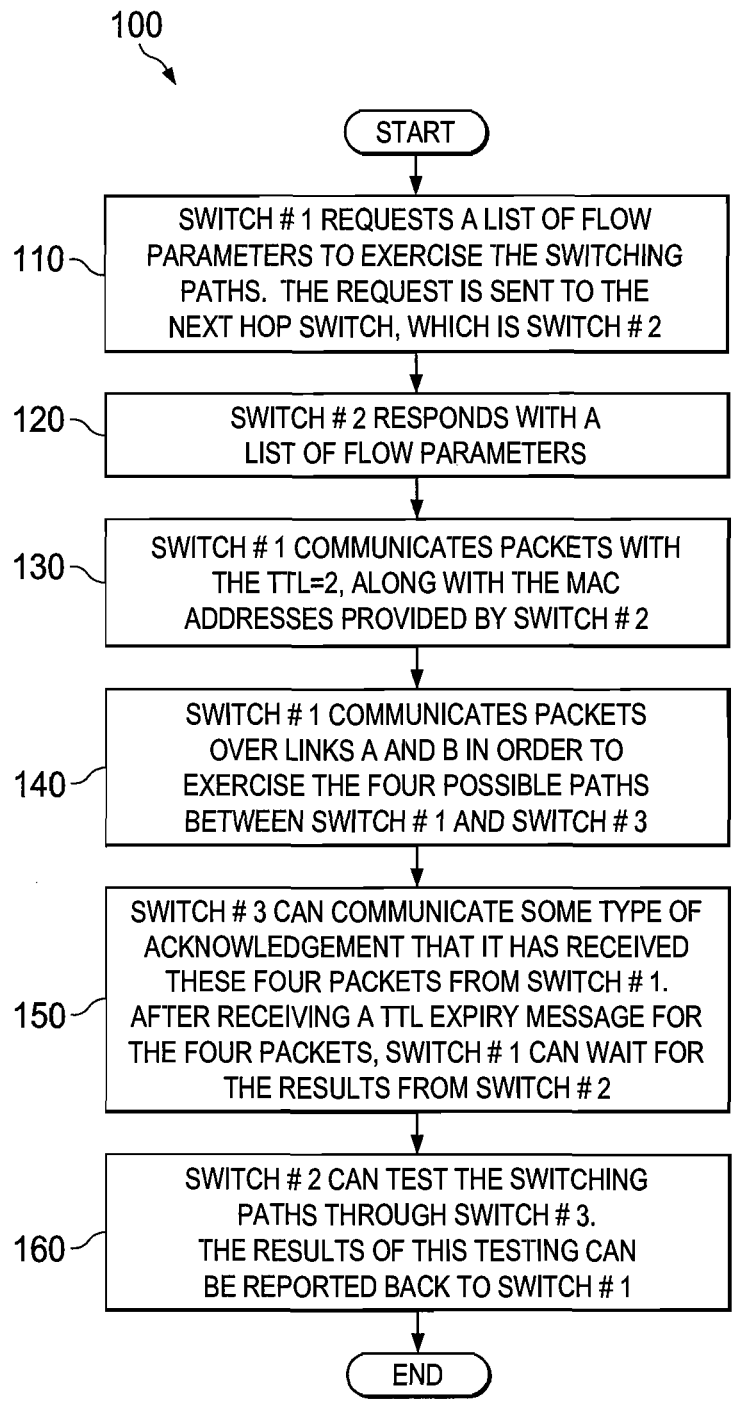
FIG. 4B is a simplified flowchart illustrating a series of example steps of an operation associated with the communication system.

Turning to FIG. 4A, FIG. 4A is a simplified block diagram illustrating the messaging that may occur within the fault monitoring protocol of communication system 10. FIG. 4B is a simplified flowchart 100 associated with the architecture of FIG. 4A, where these two illustrations are discussed together because of their relationship. The fault monitoring activity may begin at step 110 in FIG. 4B, where switch #1 requests a list of flow parameters to exercise the switching paths. More specifically, the request is sent to the next hop switch, which in this example is provided as switch #2. Accordingly, the request packet includes a TTL=1, and this initial request packet is shown in FIG. 4A.

At step 120 in FIG. 4B, switch #2 responds with the list of flow parameters. This is shown as a reply in FIG. 4A. Note that the flow parameters could simply be a list of MAC addresses that can exercise switching paths towards links c and d. In other embodiments, the flow parameters could include other network characteristics (e.g., current load, latency characteristics, processing capacity, port information, device information, bandwidth utilization, routing information, network provisioning data, etc.). At step 130 in FIG. 4B, switch #1 communicates packets with the TTL=2, along with the MAC addresses provided by switch #2. Note that because the TTL is set as 2, the packet would stop at switch #3. At step 140 in FIG. 4B, switch #1 communicates packets over links a and b in order to exercise the four possible paths between switch #1 and switch #3. The paths in this particular example include a-c, a-d, b-c, and b-d. Note that the a-d path and the b-c path are shown as diagonal arrows within switch #2.

At step 150 in FIG. 4B, switch #3 can communicate some type of acknowledgment, indicating that it has received these four packets from switch #1. After receiving a TTL expiry message for the four packets, switch #1 can wait for the results from switch #2. From this point, switch #1 can use this information to make intelligent decisions about which links are operational and which links may be problematic in the network. The process can end at this juncture, or alternatively switch #2 can repeat this protocol. For example, at step 160 in FIG. 4B, switch #2 can test the switching paths through switch #3. The results of this testing by switch #2 can be reported back to switch #1. In particular implementations, the fault monitoring would terminate at the destination node. In the particular example of FIG. 4A, the fault monitoring would stop at switch #4.

In more specific implementations, the fault monitoring can be executed using the following particular process:
  Process(monitor VLAN x, destination y);
  {Fetch (list of MAC_addresses to exercise ECMPs through the next hop switch);
    Start test flows, one for each ECMP;
    Send Request to next hop switches(monitor VLAN x, destination y);
    Wait for response;
    Return report to the originating switch in case of error}.

For packet formatting, in the specific case of TRILL networks, fault monitoring over ECMPs can be performed in layer 2 (L2), layer 3 (L3), or layer 4 (L4) fields, or a suitable combination thereof. Fault monitoring, fault isolation, and path discovery can be performed in the context of a specific traffic flow. The TRILL messages can include the same L2 fields (MAC Source Address, MAC Destination Address, VLAN), L3 fields (IP source address, IP Destination Address), and L4 fields (Source Port, Destination Port) as the actual flow being tested. The trace and reply messages can be standalone layer 2 control messages, or take any other suitable format, which may be based on particular needs.

Note that in certain example implementations, the switching functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, proactive fault monitoring modules 22a-d include software in order to achieve the fault monitoring functions outlined herein. These activities can be facilitated by switches 12, 14, 16, and 18 and/or any of the elements of FIGS. 1-4A. Switches 12, 14, 16, and 18 can include memory elements for storing information to be used in achieving the intelligent switching control, as outlined herein. Additionally, switches 12, 14, 16, and 18 may include a processor that can execute software or an algorithm to perform the fault monitoring activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of clouds, networks, and/or switches, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where proactive fault monitoring modules 22a-d are provided within the switches, these modules can be provided externally, or consolidated and/or combined in any suitable fashion. In certain instances, proactive fault monitoring modules 22a-d are provided in a single proprietary unit.

It is also important to note that the steps discussed with reference to FIGS. 1-4B illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in DCE and TRILL environments or arrangements, the present disclosure may be used in any communications environment that could benefit from such technology. Virtually any configuration that seeks to intelligently fault monitor could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
communicating a request packet from an originating network element to a first next hop network element, wherein the request packet is associated with a request for a list of MAC addresses;
receiving a response to the request;
communicating a test packet to initiate fault monitoring, wherein the test packet is communicated to a second next hop network element and the test packet includes at least one of the MAC addresses provided by the first next hop network element; and
receiving a plurality of fault monitoring results, wherein the results are limited to reflect results of monitoring multiple paths between the originating network element and the second hop network element and associated with the first next hop network element;
wherein the fault monitoring comprises at least one of detecting, isolating, and correcting a malfunction in the multiple paths between the originating network element and the second hop network element and associated with the first next hop network element; and
wherein the originating network element and the second next hop network element are connected via a plurality of paths through the first hop network element and the test packet is communicated using equal cost multipath ("ECMP") routing.

2. The method of claim 1, wherein the response to the request includes a media access control (MAC) address associated with the second network element.

3. The method of claim 1, wherein the request packet includes a time to live (TTL) parameter set to one.

4. The method of claim 1, wherein a TTL expiry message is received in response to the test packet.

5. The method of claim 1, wherein the first network element and the second network element are separated by one hop in a network environment.

6. The method of claim 1, wherein the request packet is communicated by an originating switch operating in a multipath network, and wherein the flow parameters are associated with equal cost multiple paths (ECMPs) two hops from the originating switch.

7. The method of claim 1, wherein an additional request is communicated to an additional network element, the additional request being associated with a request for an additional list of flow parameters, and wherein the additional request triggers a subsequent fault monitoring process associated with the additional network element.

8. One or more non-transitory tangible media that includes code for execution and when executed by a processor operable to perform operations comprising:
communicating a request packet from an originating network element to a first next hop network element, wherein the request packet is associated with a request for a list of MAC addresses;
receiving a response to the request;
communicating a test packet to initiate fault monitoring, wherein the test packet is communicated to a second next hop network element and the test packet includes at least one of the MAC addresses provided by the first next hop network element; and
receiving a plurality of fault monitoring results, wherein the results are limited to reflect results of monitoring multiple paths between the originating network element and the second hop network element and associated with the first next hop network element;
wherein the fault monitoring comprises at least one of detecting, isolating, and correcting a malfunction in the multiple paths between the originating network element and the second hop network element and associated with the first next hop network element; and
wherein the originating network element and the second next hop network element are connected via a plurality of paths through the first hop network element and the test packet is communicated using equal cost multipath ("ECMP") routing.

9. The media of claim 8, wherein the response to the request includes a media access control (MAC) address associated with the second network element.

10. The media of claim 8, wherein the request packet includes a time to live (TTL) parameter set to one.

11. The media of claim 8, wherein a TTL expiry message is received in response to the test packet.

12. The media of claim 8, wherein the first network element and the second network element are separated by one hop in a network environment.

13. The media of claim 8, wherein the request packet is communicated by an originating switch operating in a multipath network, and wherein the flow parameters are associated with equal cost multiple paths (ECMPs) two hops from the originating switch.

14. The media of claim 8, wherein an additional request is communicated to an additional network element, the additional request being associated with a request for an additional list of flow parameters, and wherein the additional request triggers a subsequent fault monitoring process associated with the additional network element.

15. An apparatus, comprising:
a memory element configured to store electronic code,
a processor operable to execute instructions associated with the electronic code, and
a fault monitoring module configured to interface with the processor and the memory element in order to cause the apparatus to:
  communicate a request packet from an originating network element to a first next hop network element, wherein the request packet is associated with a request for a list of MAC addresses;
  receive a response to the request;
  communicate a test packet to initiate fault monitoring, wherein the test packet is communicated to a second next hop network element and the test packet includes at least one of the MAC addresses provided by the first next hop network element; and
  receive a plurality of fault monitoring results, wherein the results are limited to reflect results of monitoring multiple paths between the originating network element and the second hop network element and associated with the first next hop network element;
  wherein the fault monitoring comprises at least one of detecting, isolating, and correcting a malfunction in the multiple paths between the originating network element and the second hop network element and associated with the first next hop network element; and
  wherein the originating network element and the second next hop network element are connected via a plurality of paths through the first hop network element and the test packet is communicated using equal cost multipath ("ECMP") routing.

16. The apparatus of claim 15, wherein the response to the request includes a media access control (MAC) address associated with the second network element.

17. The apparatus of claim 15, wherein the request packet includes a time to live (TTL) parameter set to one.

18. The apparatus of claim 15, wherein a TTL expiry message is received in response to the test packet.

19. The apparatus of claim 15, wherein the first network element and the second network element are separated by one hop in a network environment.

20. The apparatus of claim 15, wherein an additional request is communicated to an additional network element, the additional request being associated with a request for an additional list of flow parameters, and wherein the additional request triggers a subsequent fault monitoring process associated with the additional network element.

* * * * *